United States Patent [19]

Lawrence et al.

[11] Patent Number: 4,526,633
[45] Date of Patent: Jul. 2, 1985

[54] FORMULATING AND DELIVERY SYSTEM FOR EMULSION BLASTING

[75] Inventors: Larry D. Lawrence, Salt Lake City; Walter B. Sudweeks, Orem; Raymond D. Larsen, Sandy, all of Utah

[73] Assignee: IRECO Incorporated, Salt Lake City, Utah

[21] Appl. No.: 592,528

[22] Filed: Mar. 23, 1984

Related U.S. Application Data

[63] Continuation of Ser. No. 434,549, Nov. 8, 1982, abandoned, which is a continuation of Ser. No. 111,831, Jan. 14, 1980, abandoned.

[51] Int. Cl.³ ............................................. D03D 23/00
[52] U.S. Cl. .................................... 149/109.6; 86/23; 102/313; 264/3 R
[58] Field of Search .......................... 149/109.6; 86/23; 102/313; 264/3 R

[56] References Cited

U.S. PATENT DOCUMENTS

| 4,138,281 | 2/1979 | Olney et al. | 149/46 X |
| 4,356,044 | 10/1982 | Jessop et al. | 149/60 X |
| 4,428,784 | 1/1984 | Jessop et al. | 149/21 X |
| 4,428,786 | 1/1984 | Arni | 149/21 |

Primary Examiner—Stephen J. Lechert, Jr.

[57] ABSTRACT

The invention is a method and apparatus for formulating and delivering emulsion slurry blasting agents in a self-contained, "on-site," movable system, such as a heavy duty truck which houses the necessary apparatus for formulating the emulsion blasting agent. A key part of the apparatus is a blender in which the emulsion phase is formed.

5 Claims, 6 Drawing Figures

—A—
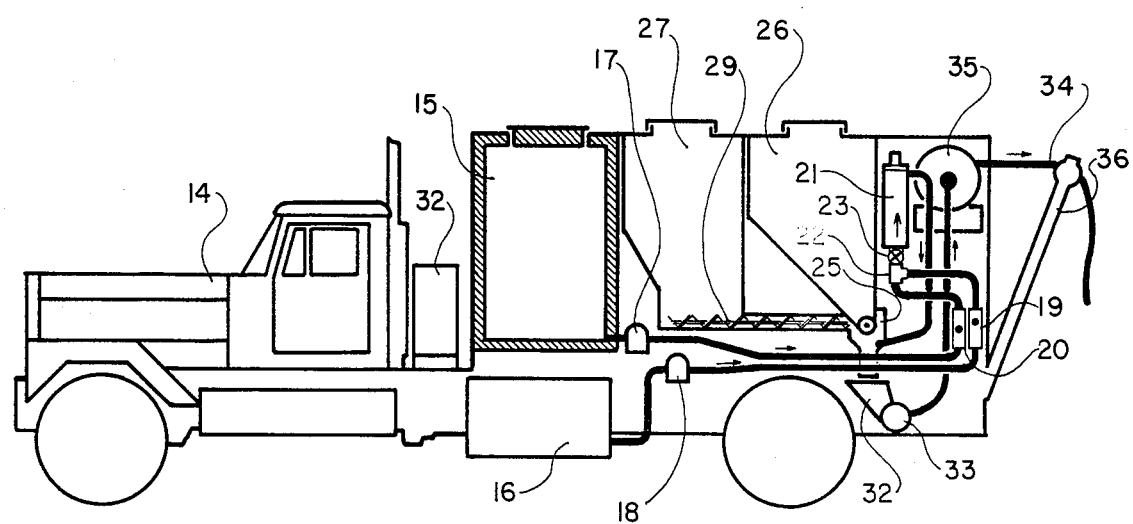
figure 2  SIDE VIEW
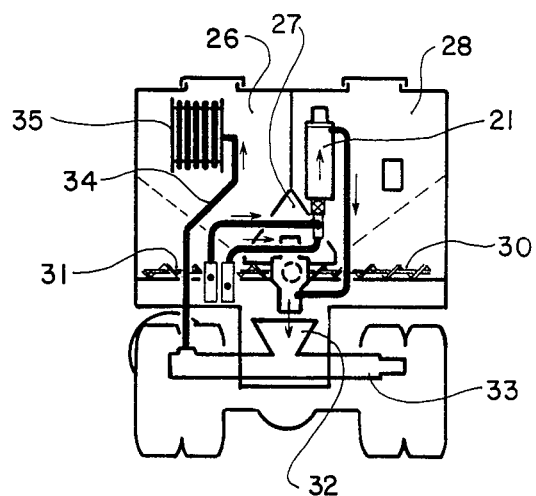
figure 3  REAR VIEW

SECTION A-A

FORMULATING AND DELIVERY SYSTEM FOR EMULSION BLASTING

This is a continuation of application Ser. No. 434,549, filed Nov. 8, 1982, now abandoned, which is a continuation of application Ser. No. 111,831 filed Jan. 14, 1980, now abandoned.

The present invention relates to a method and apparatus for formulating blasting agents and delivering them in bulk into a borehole or other receptacle. More specifically, the invention relates to a method and apparatus for the "on-site" formulating and delivery of water-in-oil emulsion blasting agents. By "on-site" is meant that both the formulating and delivery operations are conducted at the blasting location or site. This means that the blasting agents are "site-mixed" in a movable apparatus as opposed to being "plant-mixed" at a remotely located, stationary facility. The advantages of this "site-mixed system" are described below.

BACKGROUND OF THE INVENTION

Slurry explosives or blasting agents are used commonly in the mining industry. They generally contain a thickened oxidizer salt solution that forms a continuous aqueous phase throughout which is dispersed solid and/or liquid fuels, sensitizers, density reducing agents and other ingredients. Equipment for the bulk delivery of these blasting agents have been developed. For example, U.S. Pat. Nos. 3,303,738 and 3,380,333 disclose a method and apparatus for the bulk delivery of slurry blasting agents into a borehole. The disclosed apparatus is a heavy duty truck upon which is housed equipment for storage and transportation of blasting agent ingredients, for the blending and mixing of such ingredients into a slurry blasting agent and for the pumping of the blended slurry blasting agent into a borehole. Since the truck is self-contained with respect to the equipment for formulating and pumping the slurry blasting agent, it can be driven to the desired blasting site and there operated so as to manufacture and deliver the slurry blasting agent on-site and into a borehole. Thus, the slurry blasting agent ingredients, which are not detonable by themselves, can be transported safely by the truck, and a detonable blasting agent is formed only immediately prior to delivery of the agent into a borehole for subsequent detonation. The inherent safety advantages of this system are obvious.

Another advantage of this "site-mixed" "pump-truck" system is that the proportion of the ingredients being blended can be varied continuously or step-wise in a predetermined manner, and thus the composition of the slurry blasting agent can be tailored to meet varying blasting conditions, even within a single borehole. Other truck systems which simply repump or extrude slurry blasting agents previously formulated at a stationary facility do not have this advantage or the previously described safety advantage. The site-mixed system has received worldwide acceptance in many different types of mines and mining conditions. U.S. Pat. No. 4,112,240 also discloses a site-mixed system.

In contradistinction to slurry blasting agents, emulsion explosives or blasting agents have a continuous oil phase rather than a continuous aqueous phase. Droplets of an aqueous solution of oxidizer salt are dispersed or emulsified throughout the continuous oil phase and, as desired, solid ingredients such as undissolved oxidizer salt, fuel, or density reducing agents also are dispersed throughout the continuous oil phase. These blasting agents are referred to herein as water-in-oil emulsion blasting agents.

Water-in-oil emulsion blasting agents are known in the art. See, for example, U.S. Pat. Nos. 4,141,767; 4,110,134; 3,447,978 and 3,161,551. Water-in-oil emulsion blasting agents are found to have certain distinct advantages over conventional slurry blasting agents, as explained in U.S. Pat. No. 4,141,767. The above patents describe certain specialized methods for the manufacture of water-in-oil emulsion blasting agents, and a method and apparatus for the manufacture of such agents is described in U.S. Pat. Nos. 4,008,108 and 4,138,281. However, applicants are unaware of any site-mixed system for the delivery of water-in-oil emulsion blasting agents.

The present invention can be described as a site-mixed system for water-in-oil emulsion blasting agents which can be either cap sensitive or non-cap sensitive. This invention combines the above-described advantages of a site-mixed system and of water-in-oil emulsion blasting agents. Despite the advantages of combining a site-mixed system with a water-in-oil emulsion blasting agent, such combination has not been achieved heretofore.

SUMMARY OF THE INVENTION

The apparatus is a system for the on-site bulk manufacture and delivery of a water-in-oil emulsion blasting agent comprising a movable base upon which is housed a container for an oxidizer salt solution, a container for a solution of emulsifier and liquid organic fuel or individual containers for each ingredient; a means for combining the oxidizer salt solution, emulsifier, and liquid organic fuel to form a fluid mixture thereof; a blender for blending the fluid mixture of oxidizer salt solution, emulsifier and liquid organic fuel to form a water-in-oil emulsion phase; a container for a dry, particulate ingredient or ingredients; a means for adding the dry, particulate ingredient or ingredients to the blended water-in-oil emulsion phase; a mixer for mixing the dry, particulate ingredients uniformly throughout the water-in-oil emulsion phase to form a water-in-oil blasting agent; a means for delivering the blasting agent from the mixer; and a conduit through which the blasting agent can be delivered into a borehole or other receptacle.

The method for the manufacture and bulk delivery of water-in-oil emulsion blasting agents comprises forming an oxidizer salt solution at a temperature above the salt crystallization temperature; combining the salt solution with a liquid organic fuel and an emulsifier to form a fluid mixture thereof; blending the fluid mixture to form a water-in-oil emulsion phase wherein the step of blending includes shearing the fluid mixture preferably with a combination of stators and rotable blades; adding dry, particulate ingredients, as desired, to the emulsion phase; mixing the dry ingredients uniformly throughout the emulsion phase to form a water-in-oil emulsion blasting agent; and delivering the resultant emulsion blasting agent directly into a borehole or other receptacle.

The blender is for blending a fluid mixture of ingredients of a water-in-oil emulsion blasting agent into an emulsion phase, which blender comprises a housing having an inlet and an outlet, a shaft rotably mounted within the housing, a plurality of blades affixed to and extending from the shaft and spaced apart along the axis of the shaft, a plurality of stators rigidly mounted within the housing and interposed between some or all of the spaces between the blades, and means for rotating the shaft and blades so as to blend the fluid mixture into the emulsion phase.

BRIEF DESCRIPTION OF THE DRAWINGS

FIG. 2 is a side elevation of a pump truck in partial schematic form.

FIG. 3 is a schematic rear view of the truck shown in FIG. 2.

DETAILED DESCRIPTION OF THE INVENTION

Figure 1:
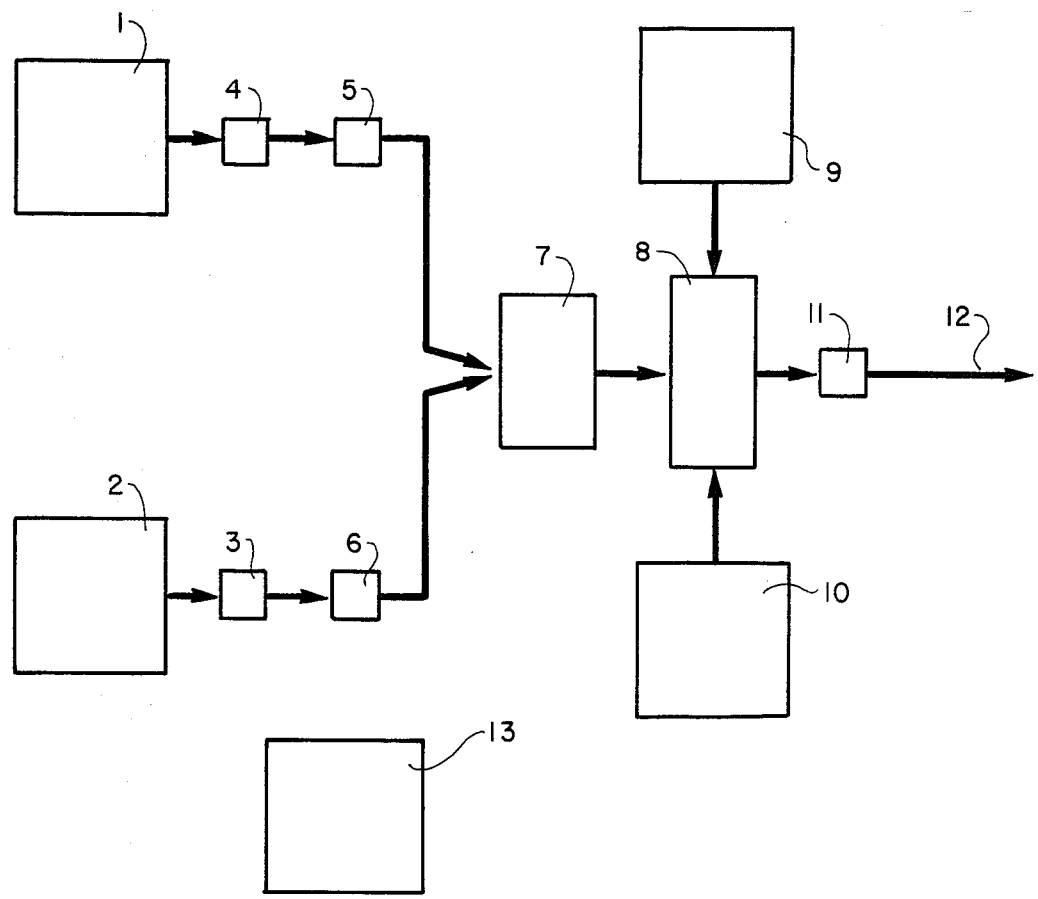
FIG. 1 is a flow diagram in accordance with the method and apparatus of this invention.

FIG. 1 is a flow diagram illustrating an embodiment of the invention. The apparatus comprises a container 1 for an oxidizer salt solution, a container 2 for a solution of liquid organic fuel and emulsifier, pumps 3 and 4, solution flow meters 5 and 6, a blender 7, a mixer 8, containers 9 and 10 (additional containers can be used) for dry, particulate ingredients, a delivery pump 11, a delivery conduit 12 and a power source 13. Not shown is a movable base upon which the apparatus preferably is housed. In operation, the solutions in containers 1 and 2 are pumped by pumps 3 and 4 through solution flow meters 5 and 6 into blender 7 in which the solutions are blended into an emulsion phase. Dry, particulate ingredients from containers 9 and 10 are then mixed into the emulsion phase to form the final water-in-oil emulsion blasting agent which is then pumped by delivery pump 11 through delivery conduit 12 into a borehole or other receptacle. Power source 13 provides power for all dynamic operations. The invention and certain preferred embodiments will be described in more detail below.

FIG. 2 is a side schematic view of a preferred embodiment of the invention. A movable base 14 houses the apparatus. Although shown in the drawing as a heavy duty truck, the movable base could be a skid, trailer, light duty truck, or other means. The movable base need not be capable of its own locomotion, as is the truck shown in the drawing, but a self-locomotive base is generally more mobile. The size and type of the base can depend upon the particular blasting application. For example, in underground applications, the base and housed apparatus may need to be relatively compact. In these applications, the movable base could be a small trailer or skid or a light duty truck. For open pit blasting applications, the heavy duty truck shown in FIG. 2 is desirable because of its large volume capacity. Numerous types of movable bases could be employed by those skilled in the art.

Mounted on the movable base 14 is an oxidizer salt solution container 15. The solution is aqueous and the dissolved oxidizer salt is that or a combination of those commonly employed in water-in-oil emulsions blasting agents. See, for example, U.S. Pat. No. 4,141,767. A means (not shown) for maintaining the oxidizer salt solution at a temperature above its crystallization temperature is employed to keep the salts in solution. One means is simply to insulate the container, but a heating element could be used if necessary or desired.

Container 16 is for a solution of liquid organic fuel and emulsifier. Although these ingredients may be kept in separate containers, preferably they are combined into a single solution. The fuel and emulsifier are of the type commonly employed in the art. If desired, the solution container(s) may be heated for fluidity and compatability with the oxidizer salt solution.

The solutions in containers 15 and 16 are pumped by pumps 17 and 18, respectively, from the containers through solution flow meters 19 and 20. The pumps can be types conventionally employed. Typical pumps include positive displacement pumps such as a Waukesha (0–150 gpm) for the oxidizer salt solution and a Delta (0–7 gpm) for the fuel and emulsifier solution. The solution flow meters can be standard tube and float rotameters or other flow monitoring means can be used. Solution flow can be adjusted manually or automatically for predetermined flow rates.

The inorganic oxidizer salt solution and the liquid organic fuel and emulsifier solution (or separate streams of fuel and of an emulsifier solution) are combined prior to blending in the blender 21. As shown in FIG. 2, the solutions are combined to form a fluid mixture in a T-joint 22 prior to entering the blender through inlet 23. However, the solutions can be combined in other ways such as in blender 21 itself, in which instance the two solution flow lines (not numbered) from meters 19 and 20 would enter blender 21 through separate inlets, preferably located in either the bottom or lower sides of blender 21.

Figures 4, 5:
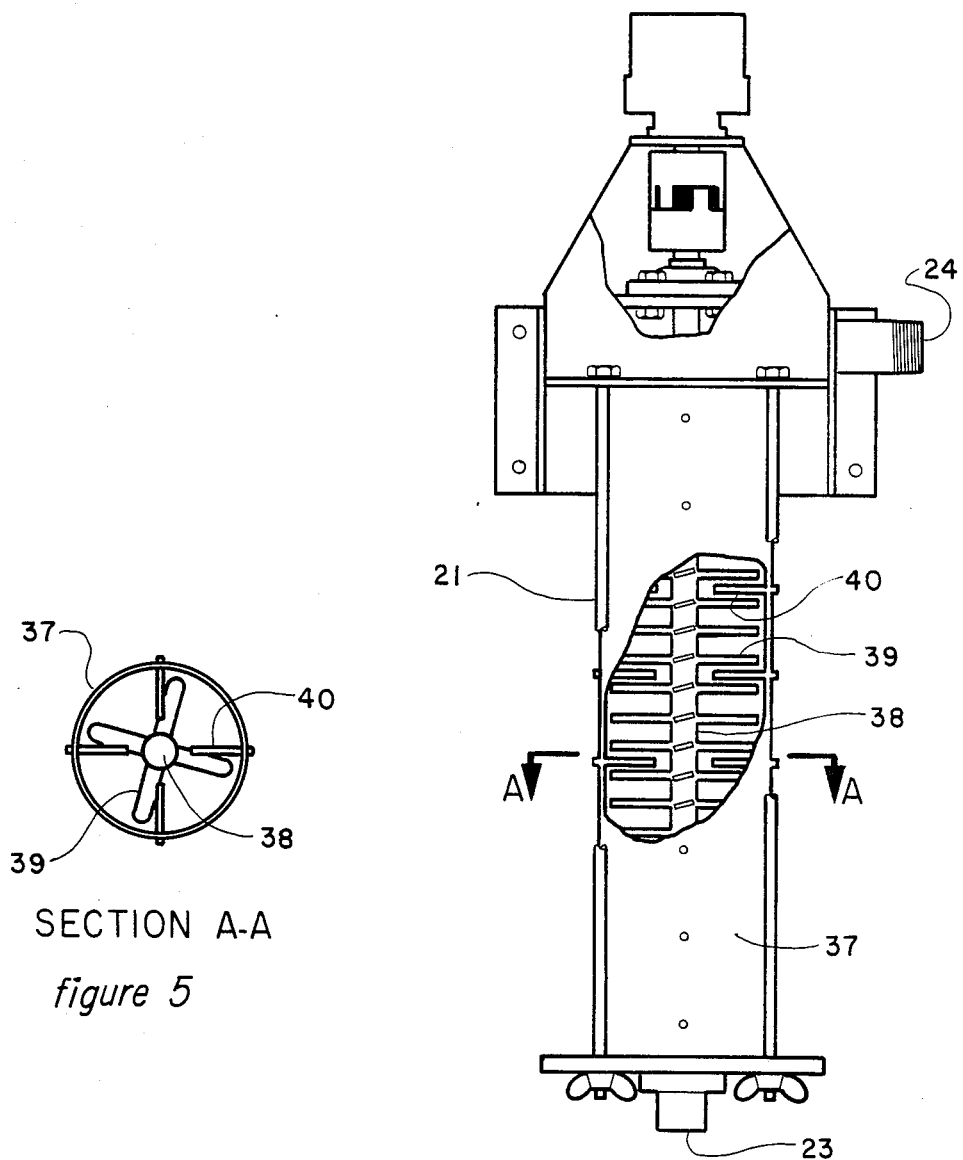
FIG. 4 is a side elevation, partially broken away, of the blender.
FIG. 5 is a cross sectional view taken along plane A—A of FIG. 4.

Blender 21 blends the inorganic oxidizer salt solution, liquid organic fuel and emulsifier with sufficient shear to form an emulsion phase of these ingredients. As shown in FIGS. 4 and 5, a preferred embodiment of the blender comprises a housing 37, having an inlet 23 and an outlet 24; a shaft 38 rotably mounted within the housing 37; blades 39 affixed to and extending from the shaft 38 and spaced apart along the axis of the shaft 38; and stators 40 mounted within the housing 37 and interposed between some or all of the spaces between the blades 39. In FIG. 4, each stator is separated by three blades. Other types of blenders which could be used include homogenizers, colloid mills, shear pumps, ultrasonic mixers, and various other appropriate types of mixers.

To initiate production of the emulsion phase, it is preferred that a seed emulsion phase be formed first. This can be accomplished by closing outlet 24 and introducing a fuel-rich blend of the oxidizer salt solution, liquid organic fuel and emulsifier into the blender 21. Then, the blades 39 are rotated, for example at a speed of 1000 rpm, to blend the ingredients into an emulsion phase. The formation of the emulsion phase can be detected by a marked increase in viscosity of the blend. Once the blender becomes filled with the seed emulsion phase, the blender speed generally is increased to 1800 rpm, for example, the outlet is opened, the liquid fuel flow rate is reduced to the desired level, and the blending process then can proceed continuously or intermittently as desired.

Figure 6:
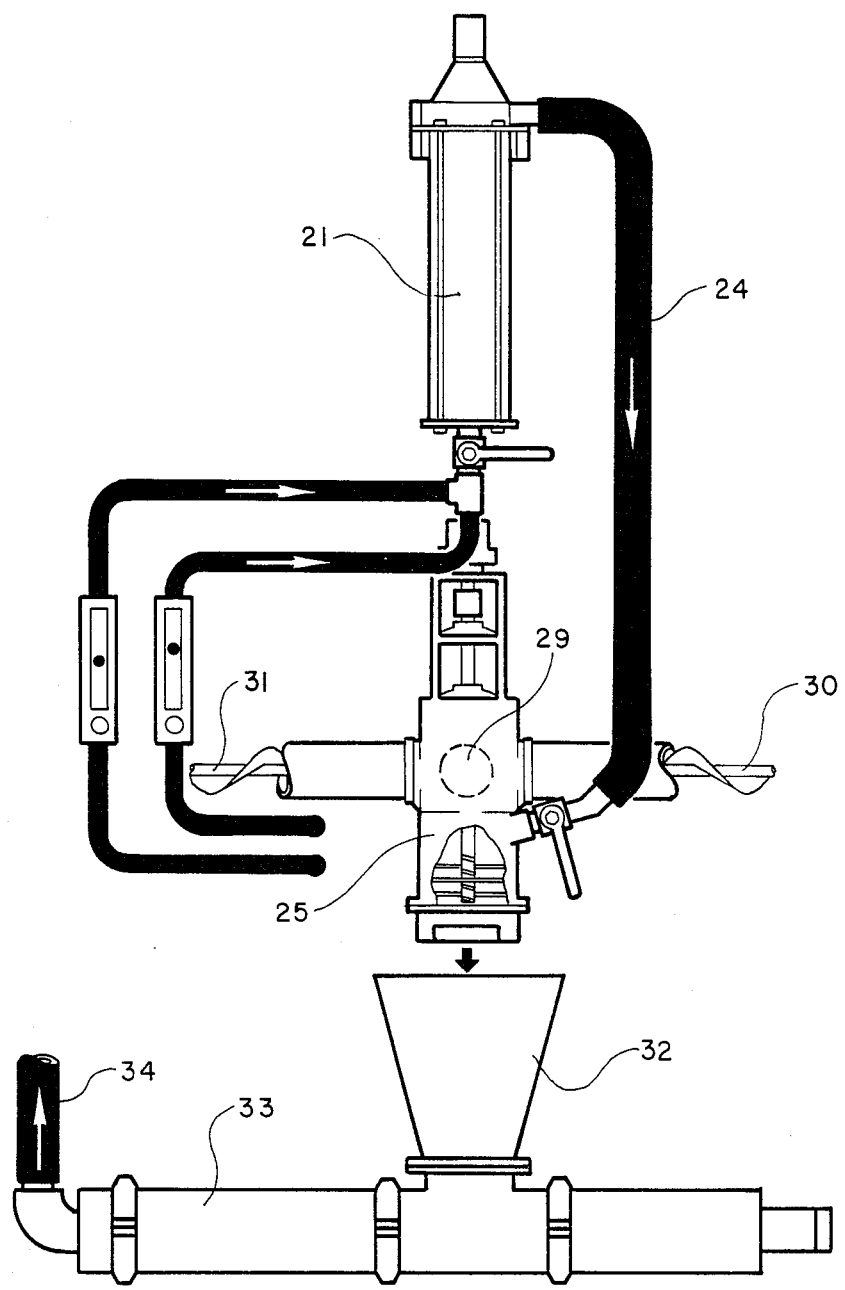
FIG. 6 is a side elevation, partially broken away, of the blending and mixing means shown in FIGS. 2 and 3.

As shown in FIG. 6, the emulsion phase goes through outlet 24 and into a dries mixer 25, wherein the dry ingredients are added from containers 24, 27 and 28 (FIGS. 2 and 3) by screw conveyors 29, 30 and 31 and then mixed uniformly throughout the emulsion phase. The dry ingredients generally include one or more particulate fuels such as aluminum granules, prilled or ground oxidizer salt, and density reducing agents such as perlite or hollow plastic or glass spheres, which, if desired, could be preadded to the oxidizer salt solution. See, for example, U.S. Pat. No. 4,141,767. The mixing is preferably accomplished by means of rotating blades or paddles in the dries mixer 25. The blender 21 could be adapted to also function as the dries mixer, wherein the dry, particulate ingredients would be added to the blender after formation of the emulsion phase. Thus, the blender and the mixer could be a single unit.

The completely formulated emulsion blasting agent leaves the dries mixer 25, enters pump funnel 32 and then enters delivery pump 33, which preferably is a positive displacement rotating screw pump, such as a Monoflo Mono (3–103 gpm $H_2O$ at 0 psi). The emulsion blasting agent then is pumped through conduit 34, preferably a heavy-duty rubber hose, and into a borehole or other receptacle. Preferably, the conduit 34 is reeled on reel 35 (shown in FIG. 2) so that the end of the conduit can be lowered and raised during the borehole filling process. The boom 36 can be used to position conduit 34 with respect to the borehole.

As an example of emulsion blasting agents formulated according to the above-described method and with the above-described apparatus, an emulsion of the type described in copending U.S. Ser. No. 004,958, containing 11 percent foil aluminum and 1.5% microballoons was formulated at a production rate of 300 lbs/min. and pumped at 170 psi through a 100 foot length of 2-inch diameter rubber hose. The emulsion blasting agent had a critical diameter of 38 mm at 5° C. at a density of 1.26 g/cc.

The power source for all dynamic operations preferably is a hydraulic system powered by a diesel or gasoline engine. The details of such a system are not shown but are well-known by those skilled in the art. Other power means would include electrical, pneumatic and mechanical systems. All of these systems or combinations thereof could be used by those skilled in the art.

The pumps and screw conveyors can be adjusted either manually or automatically to provide the desired flow rates of the various ingredients so that the formulated emulsion blasting agent has the desired composition. This composition can be changed during the formulating process, if desired, by manually or automatically adjusting the ingredient flow rates to the desired levels at the desired times. Thus, the composition of the blasting agent can be varied from the bottom of a borehole to the top, depending on the blasting agent characteristics desired, without interrupting the formulating and delivery process. Of course the blasting agent composition also can be changed from borehole to borehole if desired. An automatic metering system is not shown but is known to those skilled in the art.

While the present invention has been described with reference to certain illustrative examples and preferred embodiments, various modifications will be apparent to those skilled in the art and any such modifications are intended to be within the scope of the invention as set forth in the appended claims.

What is claimed is:

1. A method for the manufacture and bulk delivery of water-in-oil emulsion blasting agents comprising:
    (a) forming an oxidizer salt solution at a temperature above the salt crystallization temperature,
    (b) combining the salt solution with a liquid organic fuel and an emulsifier to form a fluid mixture thereof,
    (c) blending the fluid mixture to form a water-in-oil emulsion blasting agent in a blender comprising:
        (1) a housing having an inlet and an outlet,
        (2) a shaft rotably mounted within the housing,
        (3) a plurality of blades affixed to and extending in a lateral direction from the shaft and spaced apart along the axis of the shaft,
        (4) a plurality of stators rigidly mounted within the housing and interposed between some or all of the spaces between the blades, and
        (5) means for rotating the shaft and blades, and the step of rotating the shaft and blades to shear the fluid mixture and thereby form an emulsion phase.
    (d) delivering the resultant emulsion blasting agent directly into a borehole or other receptacle.

2. A method according to claim 1 wherein the salt solution and emulsifier are combined initially with an excess of liquid organic fuel and blended to form a seed emulsion phase and thereafter the salt solution, liquid organic fuel and emulsifier are combined in the desired proportions for the final emulsion phase.

3. A method according to claim 1 wherein the liquid organic fuel and emulsifier first are combined into a solution which then is combined with the salt solution prior to the blending step.

4. A method according to claim 1 wherein all steps are accomplished on a self-contained, motorized vehicle.

5. A method according to claim 1 further comprising the additional steps of adding dry, particulate ingredients to the emulsion blasting agent, and mixing the dry ingredients uniformly throughout the emulsion blasting agent.

* * * * *